United States Patent [19]

Kurami et al.

[11] Patent Number: 4,797,835

[45] Date of Patent: Jan. 10, 1989

[54] MODEL FOLLOWER CONTROL APPARATUS

[75] Inventors: Kunihiko Kurami; Kiyoshi Akutagawa, both of Kanagawa, Japan

[73] Assignee: Nissan Motor Company, Limited, Yokohama, Japan

[21] Appl. No.: 133,686

[22] Filed: Dec. 16, 1987

[30] Foreign Application Priority Data

Dec. 16, 1986 [JP] Japan ................. 61-297770
Jan. 9, 1987 [JP] Japan ................. 62-1868

[51] Int. Cl.$^4$ ............................. G05B 13/00
[52] U.S. Cl. ...................... 364/513; 364/149; 901/46; 901/9; 901/50
[58] Field of Search .......... 364/513, 149–151, 364/553; 381/561; 901/46, 9, 50

[56] References Cited

U.S. PATENT DOCUMENTS 4,707,780 11/1987 Gose et al. ............... 364/513 X
4,725,942 2/1988 Osuka ...................... 364/150
4,740,885 4/1988 Gose et al. ............... 364/149

*Primary Examiner*—Jerry Smith
*Assistant Examiner*—Allen MacDonald
*Attorney, Agent, or Firm*—Foley & Lardner, Schwartz, Jeffery Schwaab, Mack, Blumenthal & Evans

[57] ABSTRACT

An apparatus for model follower control of a robot. The apparatus comprises a source for generating target position data representing a target position for the robot, and an operation pattern generator responsive to the target position data for calculating target angular position data representing target angular positions of the robot for respective control periods. A step input calculating unit calculates step input data based on the target angular position data and the existing robot condition data from a first relationship programmed therein. A reference model responds to the step input data and calculates command data from a second relationship programmed therein. The second relationship is represented by a discrete equation. The command data are used along with the existing robot condition data in controlling the robot in a manner to perform continuous path operation of the robot. The first relationship is represented by an equation derived from the discrete equation used in calculating command data for a control period after a predetermined number of control periods. In another aspect, the reference model has a response characteristic determined by a first pole group and a second pole. The first pole group is set to have the shortest possible time constant, whereas the second pole is set to have a time constant to bring the reference model close to a model having a linear response characteristic.

7 Claims, 5 Drawing Sheets

MODEL FOLLOWER CONTROL APPARATUS

BACKGROUND OF THE INVENTION

This invention relates to a model follower control apparatus for operating a robot under a continuous path control.

Model follower control apparatus have been developed in the art. However, they are insufficient to perform optimum robot control path operation in certain respects as described hereinafter in detail.

SUMMARY OF THE INVENTION

It is a main object of the invention to provide a model follower control apparatus which can provide improved robot continuous path operation.

There is provided, in accordance with the invention, an apparatus for model follower control of a robot. The apparatus comprises sensor means sensitive to existing robot conditions for producing existing robot condition data representing the sensed robot conditions and a source for generating target position data representing a target position for the robot. The apparatus includes means responsive to the target position data for calculating target angular position data representing target angular positions of the robot for respective control periods, means responsive to the target angular position data and the existing robot condition data for calculating step input data from a first relationship programmed therein, and means responsive to the step input data for calculating command data from a second relationship programmed therein. The second relationship is represented by a discrete equation. The apparatus also includes means responsive to the command data and the existing robot condition data for controlling the robot 35 to permit continuous path operation of the robot. The first relationship is represented by an equation derived from the discrete equation used in calculating command data for a control period after a predetermined number of control periods.

In another aspect of the invention, there is provided an apparatus for model follower control of a robot having at least one robot arm axis. The apparatus comprises sensor means sensitive to existing conditions of the robot arm axis for producing existing robot condition data representing the sensed robot arm axis conditions and a source for generating target position data representing a target position for the robot arm axis. The apparatus includes means responsive to the target position data for calculating target angular position data representing target angular positions of the robot arm axis for respective control periods, means responsive to the target angular position data and the existing robot condition data for calculating step input data from a first relationship programmed therein, and means responsive to the step input data for calculating command data from a second relationship programmed therein. The second relationship is represented by a discrete equation. The apparatus also includes means responsive to the command data and the existing robot condition data for controlling the robot arm axis to permit continuous path operation of the robot. The first relationship is represented by an equation derived from the discrete equation used in calculating command data for every a predetermined number of control periods.

In another aspect, there is provided an apparatus for model follower control of a robot. The apparatus includes sensor means sensitive to existing robot conditions for producing existing robot condition data representing the sensed robot conditions and a source for generating target position data representing a target position for the robot. The apparatus includes means responsive to the target position data for calculating target angular position data representing a target angular position of the robot for every control period, means responsive to the target angular position data and command data for calculating step input data from a first relationship programmed therein, and means responsive to the step input data for calculating the command data from a second relationship programmed therein. The second relationship is represented by a discrete equation. The apparatus also includes means responsive to the command data and the existing robot condition data for controlling the robot to permit continuous path operation of the robot. The first relationship is represented by an equation derived from the discrete equation used in calculating command data for a control period after a predetermined number of control periods.

In another aspect, there is provided an apparatus for model follower control of a robot having at least one robot arm axis. The apparatus comprises sensor means sensitive to existing conditions of the robot arm axis for producing existing robot condition data representing the sensed robot arm axis conditions and a source for generating target position data representing a target position for the robot arm axis. The apparatus includes means responsive to the target position data for calculating target angular position data representing a target angular position of the robot arm axis for every control period, means responsive to the target angular position data and command data for calculating step input data from a first relationship programmed therein, means responsive to the step input data for calculating the command data from a second relationship programmed therein. The second relationship is represented by a discrete equation. The apparatus also includes means responsive to the command data and the existing robot condition data for controlling the robot arm axis to permit continuous path operation of the robot. The first relationship is represented by an equation derived from the discrete equation used in calculating command data for every a predetermined number of control periods.

In still another aspect of the invention, there is provided an apparatus for model follower control of a robot. The apparatus comprises sensor means sensitive to existing robot conditions for producing existing robot condition data representing the sensed robot conditions, a source for generating target position data, and a reference model responsive to the target position data for calculating command data from a reference model programmed therein. The reference mode has a response characteristic determined by a first pole group and a second pole. The apparatus includes means for setting the first pole group to have a shortest possible time constant, means for setting the second pole to have a time constant to bring the reference model close to a model having a linear response characteristic, and means responsive to the command data and the existing robot condition data for controlling the robot to permit continuous path operation of the robot.

BRIEF DESCRIPTION OF THE DRAWINGS

This invention will be described in greater detail by reference to the following description taken in connection with the accompanying drawings, in which like numerals identify like elements in the several figures and in which.

DETAILED DESCRIPTION OF THE PREFERRED EMBODIMENTS

Figure 1:
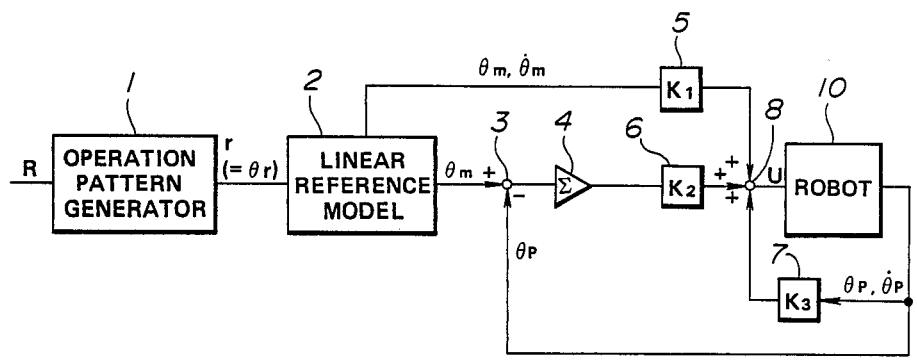
FIG. 1 is a schematic block diagram of a prior art model follower control apparatus.

Prior to the description of the preferred embodiment of the present invention, the prior art model follower control apparatus of FIG. 1 is briefly described in order to provide a basis for a better understanding of the difficulties attendant therewith.

Referring to FIG. 1, there is shown a schematic block diagram of a prior art model follower control apparatus for controlling a multi-axis robot including at least one robot arm having a plurality of axes movable about the corresponding joints of the robot arm. The multi-axis robot, designated by the numeral 10, is of the linearization type which includes an inverse system for cancelling its non-linear characteristic in a manner to provide a linear characteristic for the robot.

The model follower control apparatus includes sensor means sensitive to the existing or present angular positions of the respective robot arm axes and the existing or present velocities of movement of the respective robot arm axes for producing data $\theta p$ representing the sensed present angular positions and data $\dot{\theta}p$ representing the sensed present velocities.

The model follower control apparatus also includes an operation pattern generator 1 which receives target position data R representing a target position to which the robot arm is required to move. The operation pattern generator 1 calculates step input data r ($=\theta r$) based upon the inputted target operation data R. The calculated step input data $\theta r$ are fed to a linear reference model 2 which uses the inputted step input data r to calculate command data Xm ($\theta m$, $\dot{\theta}m$) from a discrete equation programmed into the linear reference model 2. This discrete equation is represented as $Xm(k+1) = Am \times Xm(k) + Bm \times r$. The linear reference model 2 has a response characteristic with respect to the calculated step input data r. This response characteristic is given as $Xm(k+1) = Am \times Xm(k) + Bm \times r$. The command data Xm include command angular position data $\theta m$ representing command angular positions to which the respective robot arm axes are to move along paths of movement of the respective robot arm axes and command velocity data $\dot{\theta}m$ representing command velocities at which the respective robot arm axes are to move along the respective paths. The reference model 2 calculates the command data Xm ($\theta m$, $\dot{\theta}m$) recursively for each control period. The calculated command angular position data $\theta m$ and command velocity data $\dot{\theta}m$ are fed through a first multiplier 5 to the first input of an adder 8. The linear reference model 2 also produces the calculated command velocity data $\dot{\theta}m$ to a subtractor 3 which receives another input from the sensor means. The subtractor 3 substracts the present position data $\theta p$ from the command position data $\theta m$ to produce error data between the present and command positions of the respective axes of the robot arm. The error data are integrated in an integrator 4 and then fed through a second multiplier 6 to the second input of the adder 8. The adder 8 has a third input coupled through a third multiplier 7 to the sensor means. The adder 8 adds the three inputs and produces a control signal U to control the operation of the robot 10. In FIG. 1, the letters K1, K2 and K3 designate multiplication factors set in the first, second and third multipliers 5, 6 and 7, respectively. The details of the prior art model follower control apparatus is described, for example, in the publication entitled "ICAR Proceedings"; 1983, pp. 229-235.

Figure 2:
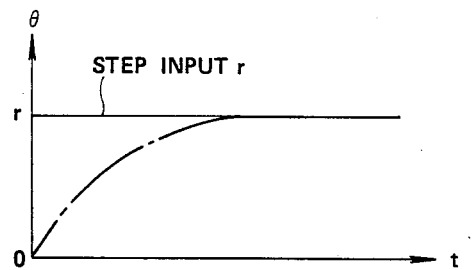
FIG. 2 is a curve of time versus step input used in explaining the difficulties attendant with the prior art model follower control apparatus of FIG. 1.

With such a prior art model follower control apparatus, however, the path of movement of each of the robot arm axes is determined only by the response characteristic of the linear reference model 2, as indicated by the one-dotted curve of FIG. 2. Since the response characteristic of the linear reference model 2 is predetermined as a linear reference model represented by $\ddot{\theta} + A_2\dot{\theta} + A_1\theta = Gr$ where $A_1$, $A_2$ and G are constants, $\theta$ is the angular position, $\dot{\theta}$ is the angular velocity and $\ddot{\theta}$ is the angular acceleration, the prior art apparatus cannot be applied to perform continuous path (CP) control capable of providing various movement path patterns although it is satisfactory in performing point-to-point (PTP) control.

Figure 3:
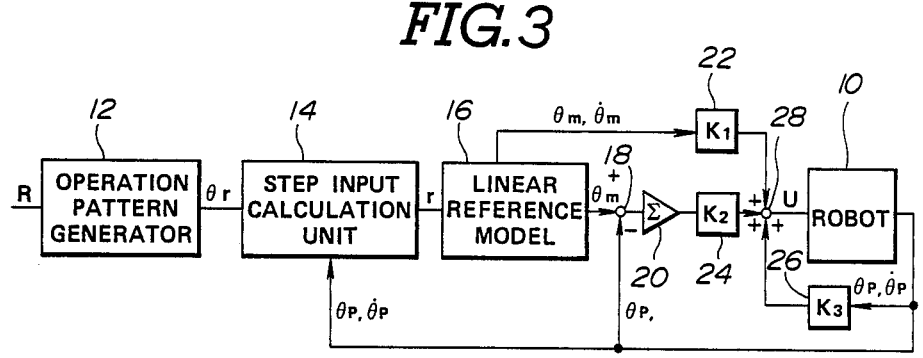
FIG. 3 is a schematic block diagram of a model follower control apparatus made in accordance with the invention.

Referring to FIG. 3, there is illustrated a model follower control apparatus embodying the invention for controlling the multi-axis robot 10. The model follower control apparatus includes sensor means sensitive to the existing or present angular positions of the respective robot arm axes and the existing or present velocities of movement of the respective robot arm axes for producing data $\theta p$ representing the sensed present angular positions and data $\dot{\theta}p$ representing the sensed present velocities.

Figure 4:
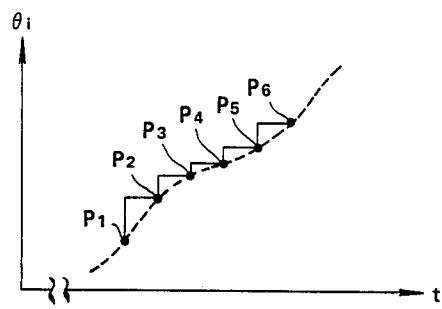
FIG. 4 is a graph used in explaining the operation of the operation pattern generator of the model follower control apparatus of FIG. 3.

The model follower control apparatus also includes an operation pattern generator 12 which receives target position data R representing a target position to which the robot arm is required to move. The target position data R are inputted periodically to the operation generator 12. When the operation pattern generator 12 receives target position data R, it calculates data $\theta r$ representing the target angular positions of each of the robot arm axes for the respective control periods for every control period and produces the calculated data $\theta r$ to a step input calculation unit 14. For example, the operation pattern generator 12 calculates the target angular positions P1, P2, P3, ... of a certain one of the robot arm axis for the respective control periods, as shown in FIG. 4. The step input calculation unit 14 also receives data representing the present angular position θp and the present velocity θ̇p from the sensor means. The step input calculation unit 14 calculates step input data r, for every control period or for every a predetermined number of control periods, from an equation programmed into the step input calculation unit 14. This equation is represented as $r=\{P-A_{11}{}^N\times \theta p(k)-A_{12}{}^N\times \dot{\theta} p(k)\}/B_{11}{}^N$ and will be explained in detail.

It is now assumed that the symbol Xm(k+N) is used to indicate the command data Xm calculated for every a predetermined number (N) of control periods. The command data Xm(k+N) includes command position data θm(k'N) and command velocity data θ̇m(k+N). The command data Xm(k+1) calculated for the next control period is given as:

$$Xm(k+1)=Am\times Xm(k)+Bm\times r$$

The command data Xm(k+2) calculated for control period after two control periods is given as:

$$\begin{aligned}Xm(k+2) &= Am \times Xm(k+1) + Bm \times r \\ &= A^2m \times Xm(k) + Am \times Bm \times r + \\ &\quad Bm \times r\end{aligned}$$

The command data Xm(k+N) calculated for the control period after N control periods where N is a predetermined value is given as:

$$\begin{aligned}Xm(k+N) &= A^Nm \times Xm(k) + \\ &\quad (A^{N-1} + A^{N-2} + \ldots + Am + II) \times \\ &\quad Bm \times r \\ &= A^Nm \times Xm(k) + B^Nm \times r\end{aligned}$$

where $$A^Nm = \begin{bmatrix} A_{11}^N & A_{12}^N \\ A_{21}^N & A_{22}^N \end{bmatrix}, B^Nm = (A^{N-1}m + A^{N-2}m + \ldots$$

and II designates a unit matrix. Thus, the command data Xm(k+N) calculated for every N-th control period may be written as:

$$Xm(k+N) = \begin{bmatrix} \theta m(k+N) \\ \dot{\theta} m(k+N) \end{bmatrix} = \begin{bmatrix} A_{11}^N & A_{12}^N \\ A_{21}^N & A_{22}^N \end{bmatrix} \begin{bmatrix} \theta m(k) \\ \dot{\theta} m(k) \end{bmatrix} + \begin{bmatrix} B_{11}^N \\ B_{21}^N \end{bmatrix} \quad (1)$$

From the relationship provided from the upper rows of the matrix representation (1), the following equation can be obtained:

$$\theta m(k+N)=A_{11}{}^N \theta m(k)+A_{12}{}^N \dot{\theta} m(k)+B_{11}{}^N\times r$$

Replacement of the command angular position θm(k+N) with the angular position data θr (=P) calculated in the operation pattern generator 12 and replacement of the command data θm(k) and θ̇m(k) with the existing robot conditions θp(k) and θ̇p(k) provides the following equation:

$$\theta r=A_{11}{}^N \theta p(k)+A_{12}{}^N \dot{\theta} p(k)+B_{11}{}^N\times r$$

After solving r, the following equation is obtained:

$$r=\{P-A_{11}{}^N \theta p(k)-A_{12}{}^N \dot{\theta} p(k)\}/B_{11}{}^N \quad (2)$$

The step input calculation unit 14 reads the existing robot condition data θp(k) and θ̇p(k) fed from the sensor means and also the next control period target position data P (=θr) calculated by the operation pattern generator 12, and it calculates step input data r for the next control period from Equation (2) programmed therein. It can be seen that the step input data r are calculated based on the target angular position data θr for the control period after N control periods and the existing robot condition data θp and θ̇p in such a manner as to compensate for the delay of the reference model in time relative to the command data.

The step input data r are fed to a reference model 16 which calculates command data Xm (θm, θ̇m) from a discrete equation programmed into the reference model 16. This discrete equation is given as $Xm(k+1)=Am\times Xm(k)+Bm\times r$ and this calculation is periodically performed recursively for the respective control periods. The command data Xm include command angular position data θm representing command angular positions to which the respective robot arm axes are to move and command velocity data θ̇m representing command velocities at which the respective robot arm axes are to move. The calculated command angular position data θm and command velocity data θ̇m are fed through a first multiplier 22 to the first input of an adder 28. The linear reference model 16 also produces the calculated command velocity data θ̇m to a subtractor 18 which receives another input from the sensor means. The subtractor 18 subtracts the present position data θp from the command position data θm to produce error data between the present and command positions of the respective robot arm axes. The error data are integrated in an integrator 20 and then fed through a second multiplier 24 to the second input of the adder 28. The adder 28 has a third input coupled through a third multiplier 26 to the sensor means. The adder 28 adds the three inputs and produces a control signal U to control the operation of the robot 10. This operation is repeated for every control period or every a predetermined number of control periods to perform the continuous path operation of the robot 10.

Although the equation programmed into the step input calculation unit 14 has been explained as given from the relationship of the upper rows of the matrix representation (1), it is to be noted that it may be derived from the relationship of the lower rows of the matrix representation (1) as:

$$\dot{\theta} m(k+N)=A_{21}{}^N \theta m(k)+A_{22}{}^N \dot{\theta} m(k)+B_{21}{}^N\times r$$

Replacement of the command angular position θm(k+N) with the average velocity V(k+N) at which the corresponding robot arm axis moves between the present position P(k) and the target angular position P(k+N) and replacement of the command data θm(k) and θ̇m(k) with the existing robot conditions θp(k) and θ̇p(k) provides the following equation:

$$V(k+N)=A_{21}{}^N \theta p(k)+A_{22}{}^N \dot{\theta} p(k)+B^N\times r$$

After solving r, the following equation is obtained:

$$r = \{V(k+N) - A_{21}{}^N \theta p(k) - A_{22}{}^N \dot{\theta} p(k)\}/B_{21}{}^N \quad (3)$$

Where $V(k+N)$ is equal to $\dot{\theta}m(k+N)$ and may be calculated as $V(k+N) = \{P(k+N) - P(k)\}/T$ where T is the time interval of the N periods. This modification is usefull particularly when the target velocity for each N periods is given.

Figure 5:
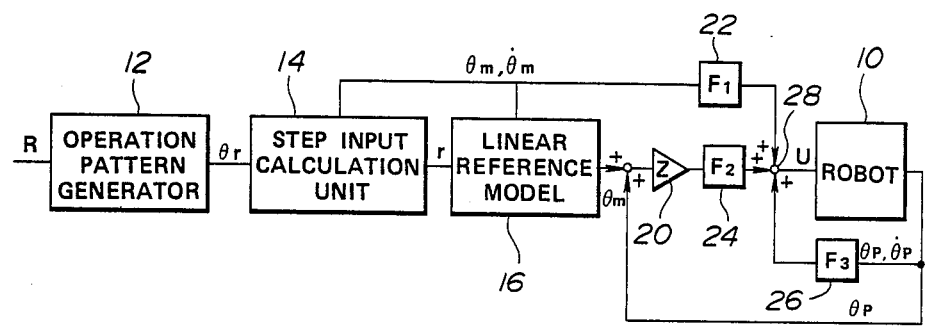
FIG. 5 is a schematic block diagram showing a modified form of the model follower control apparatus of the invention.

Referring to FIG. 5, there is illustrated another modification of the model follower control apparatus. This modification is substantially the same as the model follower control apparatus of FIG. 3 except that the step input calculation unit 14 uses the command data $\theta$m and $\dot{\theta}$m in place of the present robot conditions $\theta$p and $\dot{\theta}$p in calculating the step input data r. Accordingly, parts in FIG. 5 which are like those in FIG. 3 have been given the same reference character.

In this modification, the step input calculation unit 14 calculates the step input data r from a relationship programmed into the step input calculation unit 14. This relationship is represented as:

$$r = \{P - A_{11}{}^N \theta m(k) - A_{12}{}^N \dot{\theta} m(k)\}/B_{11}{}^N \quad (4)$$

Alternatively, the following program may be programmed into the step input calculation unit 14 for calculating the step input r:

$$r = \{V(k+N) - A_{21}{}^N \theta m(k) - A_{22}{}^N \dot{\theta} m(k)\}/B_{21}{}^N \quad (5)$$

In addition, the step input calculating unit 14 may be arranged to calculate the step input data r from the relationship represented by Equation (2) or (3) when the deviation between the existing robot condition data $\theta$p(k), $\dot{\theta}$p(k) and the command data $\theta$m(k), $\dot{\theta}$m(k) exceeds a predetermined value and from the relationship represented by Equation (4) or (5) when the deviation is less than the predetermined value.

Figure 6:
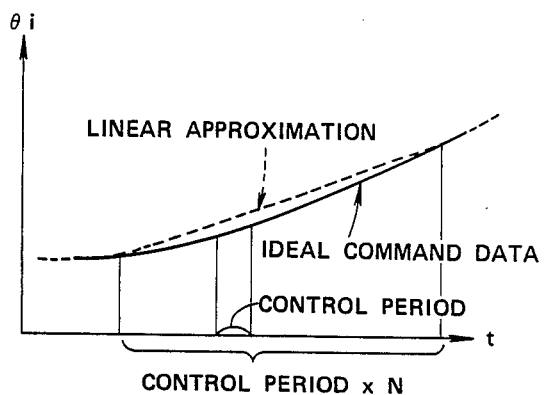
FIG. 6 is a graph used in explaining approximation of ideal command data.
Figure 7:
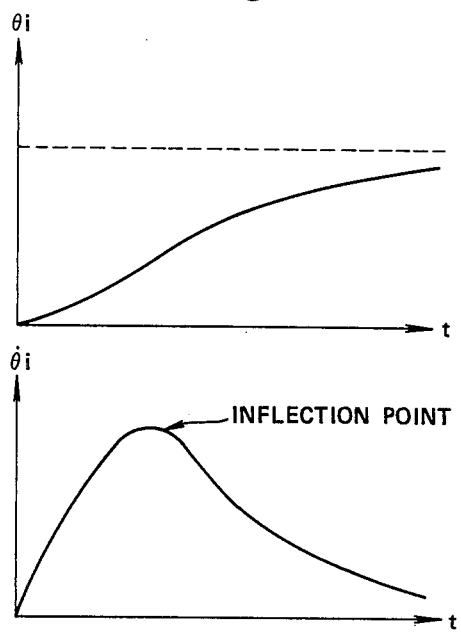
FIG. 7 contains two graphs used in explaining the difficulties with a prior art model follower control apparatus.

As described previously in connection with FIG. 1, it has been intended to perform robot continuous path control by applying step input data through a reference model to control the robot. The step input data include target positions to which the robot moves every a predetermined number (N) of periods. If the control periods are sufficiently short, the command data $\theta$ outputted from the reference model changes along a curve which can be approximated as a line, as shown in FIG. 6. Although it may be considered to employ a linear or first-order reference model, a second-order or third-order reference model is required to calculate command data $\theta$m and $\dot{\theta}$m since the robot system is a second-order system. FIG. 7 includes two graph showing the command data $\theta$m and $\dot{\theta}$m outputted from the reference model. As can be seen from FIG. 7, the command data $\theta$m have a second-order response pattern having an inflection point. Such a second-order response pattern produces a great deviation from the linear approximation, causing degreaded robot continuous path control. This is particularly true when the period of the predetermined number of control periods are long.

Figure 8:
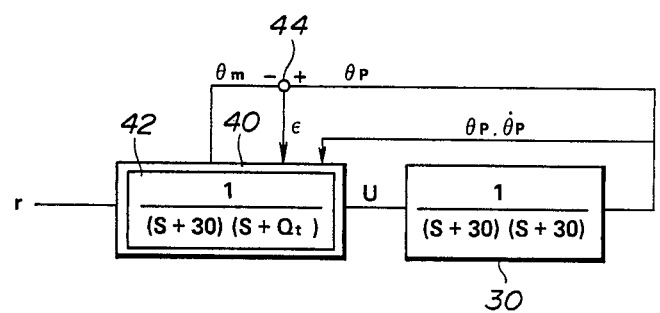
FIG. 8 is a schematic diagram showing a second embodiment of the model follower control apparatus of the invention.

Referring to FIG. 8, there is illustrated a second embodiment of the model follower control apparatus of the invention for controlling a linearization type robot 30 having at least one robot arm axis. The model follower control apparatus, generally designated by the numeral 40, includes a reference model 42. The reference model 42 receives step input data r which correspond to target positions to which the robot 30 moves every a predetermined number (N) of control periods. The model follower control apparatus 40 converts the command data $\theta$m and $\dot{\theta}$m into a control signal U which is applied to control the robot 30.

The model follower control apparatus 40 includes sensor means sensitive to the existing or present angular positions of the respective robot arm axes and the existing or present velocities of movement of the respective robot arm axes for producing data $\theta$p representing the sensed present angular positions and data $\dot{\theta}$p representing the sensed present velocities. The sensed data $\theta$p and $\dot{\theta}$p are fed to the model follower control apparatus 40.

The reference model 42 outputs the calculated command data $\theta$m to a subtractor 44 which also receives the sensed data $\theta$p. The subtractor 44 produces a deviation signal $\epsilon$ representing the difference between the command data $\theta$p and the sensed data $\theta$p. The deviation signal $\epsilon$ is applied to the model follower control apparatus 40.

The robot 30 has a transfer function represented as $1/(S+30)(S+30)$ and the reference model 42 has a transfer function $T(S)$ represented as $T(S) = 1/(S+30)(S+Q1)$. Generally for model follower control, it is possible for the reference model to produce angular position and velocity data $\theta$m and $\dot{\theta}$m corresponding to the target angular position data r by determining the parameters A1, A2 and G of the model transfer function T(S) of the reference model. This transfer function T(S) is given as:

$$T(S) = G/(S^2 + A1S + A2) \quad (6)$$

When the transfer function is given as Equation (6), the response function O(t) is represented as:

$$O(t) = e^{-at} + e^{-bt} \quad (7)$$

where a and b are extremal values.

Assuming now that the model follower control apparatus 40 operates with a 5 millisecond control period, the controllable system response speed; that is, the time constant is about 30 milliseconds which is five or six times as long as the 5 millisecond control period. Accordingly, the transfer function of the robot 30 is represented as $1/(S+30)(S+30)$.

It should be understood that the term "first pole group" is used herein in the sense of one of the two poles of a second-order reference model or two of the three poles of a third-order reference model and that the term "second pole" is used herein in the sense of the other pole of the second-order reference model or the other pole of the third-order reference model.

The time constant of the first pole of the reference model 42 is set at 30 which is the shortest possible time within the controllable limits so as to achieve the fastest possible response time. The time constant $\tau$ (=1/b) of the second pole is set at a value greater than a predetermined value determined by the robot specifications and the robot operation pattern period so that the second-order reference model 42 can be approximated as a first-order model. Preferably, the time constant of the second pole is set at the longest possible value, for example, $10^4$ milliseconds.

Accordingly, it is possible to set the first member ($e^{-at}$) or Equation (7) as a fast mode by setting the extremal value a (=1/time constant) at 30 which is the fastest response speed and to set the second member ($e^{-bt}$), of Equation (7) as a slow mode by setting the extremal value b of the second pole at 0.1 ($=1/10^4$) which is the slowest response speed. The greater the time constant of the second pole, the closer the second-order transfer function of the reference model is to the first transfer function. Although the extremal value of the first pole group has been described as a and the extremal value of the second pole is as b, it is to be noted that the extremal value of the first pole group may be b and the extremal value of the second pole may be a. The time constant $\tau$ is increased in accordance with the deviation $\epsilon$ between the command data $\theta m$ and the existing robot condition data $\theta p$ until the deviation $\epsilon$ decreases to a value smaller than a predetermined value.

Figure 9:
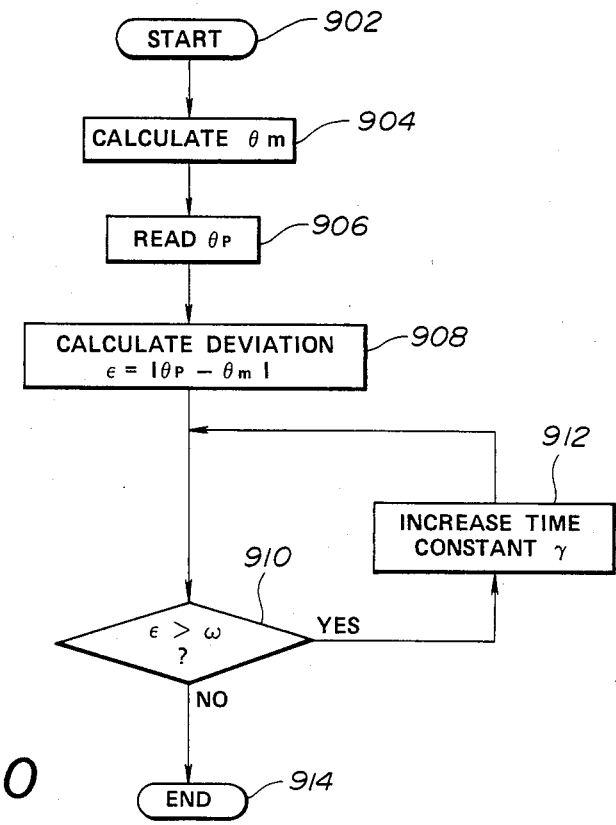
FIG. 9 is a flow diagram illustrating the programming of the digital computer as it is used to determine the time constant of the second pole of the reference model.

A digital computer may be employed to determine the time constant of the second pole of the reference model 42. FIG. 9 is a flow diagram illustrating the programming of the digital computer as it is used to determine the time constant of the second pole of the reference model 42.

Figure 10:
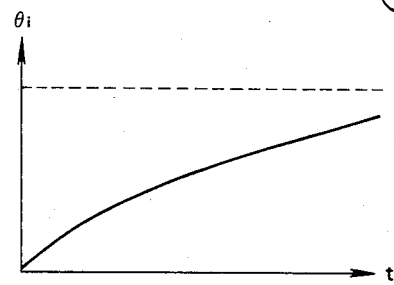
FIG. 10 contains two graphs showing command data obtained in accordance with the model follower control apparatus of FIG. 8.
Figure 10:
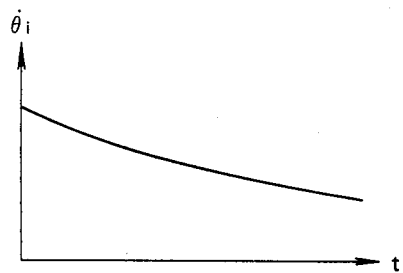

The computer program is entered at the point 902. At the point 904 in the program, the digital computer central processing unit reads the target input r and calculates a command position $\theta m$ from a relationship programmed into the digital computer memory. This relationship defines the command position $\theta m$ as a function of the target input r. At the point 906 in the program, the digital computer central processing unit reads the existing robot position $\theta p$ fed from the sensor means. At the point 908 in the program, the digital computer central processing unit calculates a deviation $\epsilon = |\theta p - \theta m|$. Following this, the program proceeds to a determination step at the point 910. This determination is as to whether or not the deviation $\epsilon$ is greater than a predetermined value $\omega$. If the answer to this question is "yes", then the program proceeds to the point 912 where the time constant $\tau$ of the second pole of the reference model $1/(S+aXS+1/\tau)$ is increased by a predetermined value and then returns to the point 910. This operation is repeated until the deviation $\epsilon$ become equal to or less than the predetermined value $\omega$ so as to bring the second-order reference model 42 close to a linear model $1/(S+1/\tau)$, as shown in FIG. 10, permitting ideal continuous path operation of the robot. Following this, the program proceeds to the end point 914.

According to this embodiment, it is possible to high response by setting the time constant of the first pole group at the shortest possible time and it is possible to bring the reference model close to a linear model having no inflection point for the command velocity data $\dot{\theta}$, as shown in FIG. 10, by setting the time constant of the second pole at the greatest possible value. The accuracy of approximation of the reference model by increasing the time constant $\tau$ of the second pole until the difference $\epsilon = |\theta p - \theta m|$ becomes below a predetermined value $\omega$.

For a reference model having a third-order response characteristic, it is possible to bring the reference model close to a linear model so as to provide optimum continuous path operation of the robot by setting the time constants of two of the three poles at the shortest possible value within the controllable limits and by setting the time constant of the other pole at the longest possible value within the controllable limits.

What is claimed is:

1. An apparatus for model follower control of a robot, comprising:
    sensor means sensitive to existing robot conditions for producing existing robot condition data representing the sensed robot conditions;
    a source for generating target position data representing a target position for the robot;
    means responsive to the target position data for calculating target angular position data representing target angular positions of the robot for respective control periods;
    means responsive to the target angular position data and the existing robot condition data for calculating step input data from a first relationship programmed therein;
    means responsive to the step input data for calculating command data from a second relationship programmed therein, the second relationship being represented by a discrete equation; and
    means responsive to the command data and the existing robot condition data for controlling the robot to permit continuous path operation of the robot;
    the first relationship being represented by an equation derived from the discrete equation used in calculating command data for a control period after a predetermined number of control periods.

2. An apparatus for model follower control of a robot having at least one robot arm axis, comprising:
    sensor means sensitive to existing conditions of the robot arm axis for producing existing robot condition data representing the sensed robot arm axis conditions;
    a source for generating target position data representing a target position for the robot arm axis;
    means responsive to the target position data for calculating target angular position data representing target angular positions of the robot arm axis for respective control periods;
    means responsive to the target angular position data and the existing robot condition data for calculating step input data from a first relationship programmed therein;
    means responsive to the step input data for calculating command data from a second relationship programmed therein, the second relationship being represented by a discrete equation; and
    means responsive to the command data and the existing robot condition data for controlling the robot arm axis to permit continuous path operation of the robot;
    the first relationship being represented by an equation derived from the discrete equation used in calculating command data for every a predetermined number of control periods.

3. An apparatus for model follower control of a robot, comprising:
    sensor means sensitive to existing robot conditions for producing existing robot condition data representing the sensed robot conditions;
    a source for generating target position data representing a target position for the robot;
    means responsive to the target position data for calculating target angular position data representing a target angular position of the robot for every control period;
    means responsive to the target angular position data and command data for calculating step input data from a first relationship programmed therein;
    means responsive to the step input data for calculating the command data from a second relationship programmed therein, the second relationship being represented by a discrete equation; and means responsive to the command data and the existing robot condition data for controlling the robot to permit continuous path operation of the robot;

the first relationship being represented by an equation derived from the discrete equation used in calculating command data for a control period after a predetermined number of control periods.

4. An apparatus for model follower control of a robot having at least one robot arm axis, comprising:

sensor means sensitive to existing conditions of the robot arm axis for producing existing robot condition data representing the sensed robot arm axis conditons;

a source for generating target position data representing a target position for the robot arm axis;

means responsive to the target position data for calculating target angular position data representing a target angular position of the robot arm axis for every control period;

means responsive to the target angular position data and command data for calculating step input data from a first relationship programmed therein;

means responsive to the step input data for calculating the command data from a second relationship programmed therein, the second relationship being represented by a discrete equation; and means responsive to the command data and the existing robot condition data for controlling the robot arm axis to permit continuous path operation of the robot;

the first relationship being represented by an equation derived from the discrete equation used in calculating command data for every a predetermined number of control periods.

5. An apparatus for model follower control of a robot, comprising:

sensor means sensitive to existing robot conditions for producing existing robot condition data representing the sensed robot conditions;

a source for generating target position data;

a reference model responsive to the target position data for calculating command data from a reference model programmed therein, the reference model having a response characteristic determined by a first pole group and a second pole;

means for setting the first pole group to have a shortest possible time constant;

means for setting the second pole to have a time constant to bring the reference model close to a model having a linear response characteristic; and means responsive to the command data and the existing robot condition data for controlling the robot to permit continuous path operation of the robot.

6. The apparatus as claimed in claim 5, wherein the existing robot condition data include an existing robot position and the target position data include a target robot position.

7. The apparatus as claimed in claim 6, which includes means for calculating a difference between the target and existing robot positions and means for increasing the time constant of the second pole until the difference becomes below a predetermined value.

* * * * *